United States Patent
Traustadottir et al.

(10) Patent No.: US 10,391,722 B1
(45) Date of Patent: Aug. 27, 2019

(54) METHOD OF PRODUCING AEROFOILS

(71) Applicant: University of Iceland, Reykjavik (IS)

(72) Inventors: Solrun Traustadottir, Hafnarfjordur (IS); Andri Orrason, Mosfellsbaer (IS)

(73) Assignee: UNIVERSITY OF ICELAND (IS)

( * ) Notice: Subject to any disclaimer, the term of this patent is extended or adjusted under 35 U.S.C. 154(b) by 8 days.

(21) Appl. No.: 15/647,974

(22) Filed: Jul. 12, 2017

(51) Int. Cl.
| | |
|---|---|
| *B29C 70/34* | (2006.01) |
| *B29C 70/54* | (2006.01) |
| *B29D 99/00* | (2010.01) |
| *F01D 5/28* | (2006.01) |
| *B29L 31/08* | (2006.01) |
| *B29K 627/18* | (2006.01) |
| *B29K 705/00* | (2006.01) |
| *B64C 11/26* | (2006.01) |
| *B29K 307/04* | (2006.01) |

(52) U.S. Cl.
CPC .......... *B29C 70/342* (2013.01); *B29C 70/545* (2013.01); *B29D 99/0028* (2013.01); *B29K 2307/04* (2013.01); *B29K 2627/18* (2013.01); *B29K 2705/00* (2013.01); *B29L 2031/082* (2013.01); *B64C 11/26* (2013.01); *F01D 5/282* (2013.01); *F05D 2230/10* (2013.01); *F05D 2230/20* (2013.01); *F05D 2300/17* (2013.01)

(58) Field of Classification Search
CPC . B29L 2031/08–087; B29L 2031/3058; B29L 2031/3085; B64C 11/24–26; B29D 99/0025; B29D 99/0028; B29C 70/342
See application file for complete search history.

(56) References Cited

U.S. PATENT DOCUMENTS

| | | | | |
|---|---|---|---|---|
| 3,291,672 A | * | 12/1966 | Sonneborn | B29B 15/122 156/275.5 |
| 9,199,419 B2 | * | 12/2015 | Lyons | B29C 70/446 |
| 2012/0312469 A1 | * | 12/2012 | Stiesdal | B29C 33/68 156/289 |
| 2014/0369845 A1 | * | 12/2014 | Ruijter | F01D 5/141 416/224 |
| 2016/0354968 A1 | * | 12/2016 | Zamora Rodriguez | B29C 70/443 |

FOREIGN PATENT DOCUMENTS

DE        2856661 A1 *  7/1980  ......... B29C 33/0011

OTHER PUBLICATIONS

Machine translation of German Patent Publication No. DE-2856661A1, originally published Jul. 1980, 7 pages (Year: 1980).*
Willem Toet, Icelandic Aerofoil Humbles Formula 1 Engineer, https://www.linkedin.com/pulse/icelandic-aerofoil-humbles-formula-1-engineer-willem-toet?trk=mp-reader-card, published Aug. 29, 2016, printed Sep. 26, 2017 (9 pages).

* cited by examiner

*Primary Examiner* — William P Bell
(74) *Attorney, Agent, or Firm* — Heslin Rothenberg Farley & Mesiti P.C.

(57) ABSTRACT

The invention provides a method of molding composite material aerofoil, comprising steps of (i) providing a mold having the desired three-dimensional shape; (ii) providing a first layer over the mold that adheres to the mold and has a non-adhesive outer surface; (iii) applying composite material over the first layer; (iv) laying a moldable sheet over the composite material; (v) curing the resulting assembly and (vi) removing the moldable sheet and mold to leave an intact one-piece aerofoil structure.

17 Claims, 2 Drawing Sheets

METHOD OF PRODUCING AEROFOILS

FIELD

The invention relates to a process for manufacturing aerofoils, such as wings, propeller blades, rotor blades and the like. The invention also relates to aerofoils prepared by the disclosed process.

BACKGROUND

Aerofoils (airfoils) are structures that generate aerodynamic forces when traveling through a fluid such as water or air. These structures are commonly found on vehicles that are designed to move at high speed, such as airplanes, helicopters, race cars and boats.

When moving through a fluid, aerofoils generate lift, which is the force that is perpendicular to the direction of motion. The direction and amplitude of the lift is controlled by the angle of attack and shape of the aerofoil. The aerofoil deflects incoming air, resulting in a force that is in the direction that is generally opposite to the deflection (the force component parallel to the direction of motion is called drag).

For use on airplanes, aerofoils are produced from material that ideally has properties of strength, elasticity, low weight and corrosion resistance. Commonly, airplane aerofoils are made from metals or metal alloys.

More recently, aerofoils are produced from composite materials, since those combine advantageous properties of being very strong and corrosion resistant, yet having low weight. In general, composite materials consist of a combination of materials that are mixed together to form a structure (composite) that has specific structural properties. The combined materials in the structure do not merge or dissolve in the structure; rather, the individual components act in a synergetic fashion in the final structure. Composite materials usually contain a fibrous material that is embedded in a resin matrix. Load on the material will be transferred to the fibers by the surrounding matrix. The strength and stiffness of the material will in turn depend on the orientation and stacking of the fibers. A unidirectional material will have fibers that all run in the same direction, while fibers in a bidirectional material typically run in directions that are 90° apart, i.e. they are perpendicular to one another.

Aerofoils are typically produced in parts, i.e. parts of the aerofoil are produced independently and the individual parts joined together to form the final structure. The disadvantage of such production methods is that there will be joints where the parts meet, and such joints may have irregularities, which leads to suboptimal aerodynamic properties of the aerofoil. Further, the strength of the aerofoil can be compromised when it is manufactured in parts.

For example, aerofoils that are used in race cars are typically manufactured as two main components that are joined together to form the aerofoil. Usually, there are two molds used in such production, an upper mold and a lower mold. The molds will usually meet at the upper or lower side of the aerofoil, rather than at its leading edge, to avoid having a joint at the leading edge which is both structurally critical and could lead to greatly diminished aerodynamic properties of the aerofoil.

Yet, the final molded and glued aerofoil will need substantial post-production to smoothen out any rough edges that may have formed at the joint of the two (or more) parts. While it is possible to apply coating to the final structure to smoothen out any irregularities and improve its aerodynamic properties, such post-production has the disadvantages that it increases cost of production and also results in increased weight of the product. Particularly in race cars, such increased weight is to be avoided.

SUMMARY

The present invention provides a process of producing composite material aerofoils that does not require post-production assembly of individual components forming the upper and lower surfaces of the aerofoil. In other words, the aerodynamic components of the aerofoil structure can be produced as a single structure, eliminating the need for post-production gluing of individual parts of the aerodynamic structure (upper and lower surfaces).

In one aspect, the invention provides a method of producing a composite material aerofoil, the method comprising steps of (a) providing a mold having a three-dimensional shape of an aerofoil to be molded, the mold having a front edge, a trailing edge and upper and lower surfaces that extend from the front edge to the trailing edge; (b) providing a first layer having an adhesive side and a non-adhesive side over the mold, the adhesive side facing the mold; (c) laying composite precursor material over the non-adhesive side of the first layer; (d) laying a moldable sheet over the composite precursor material on the mold, such that there is a snug fit of the moldable sheet to the composite precursor material, thereby generating a molding assembly; (e) curing the molding assembly from step d; and (f) removing at least the moldable sheet and mold to provide a finished composite material aerofoil.

The invention also provides aerofoil structures produced by the method described herein.

BRIEF DESCRIPTION OF THE DRAWINGS

The skilled person will understand that the drawings, described below, are for illustration purposes only. The drawings are not intended to limit the scope of the present teachings in any way.

DETAILED DESCRIPTION

Figure 1:
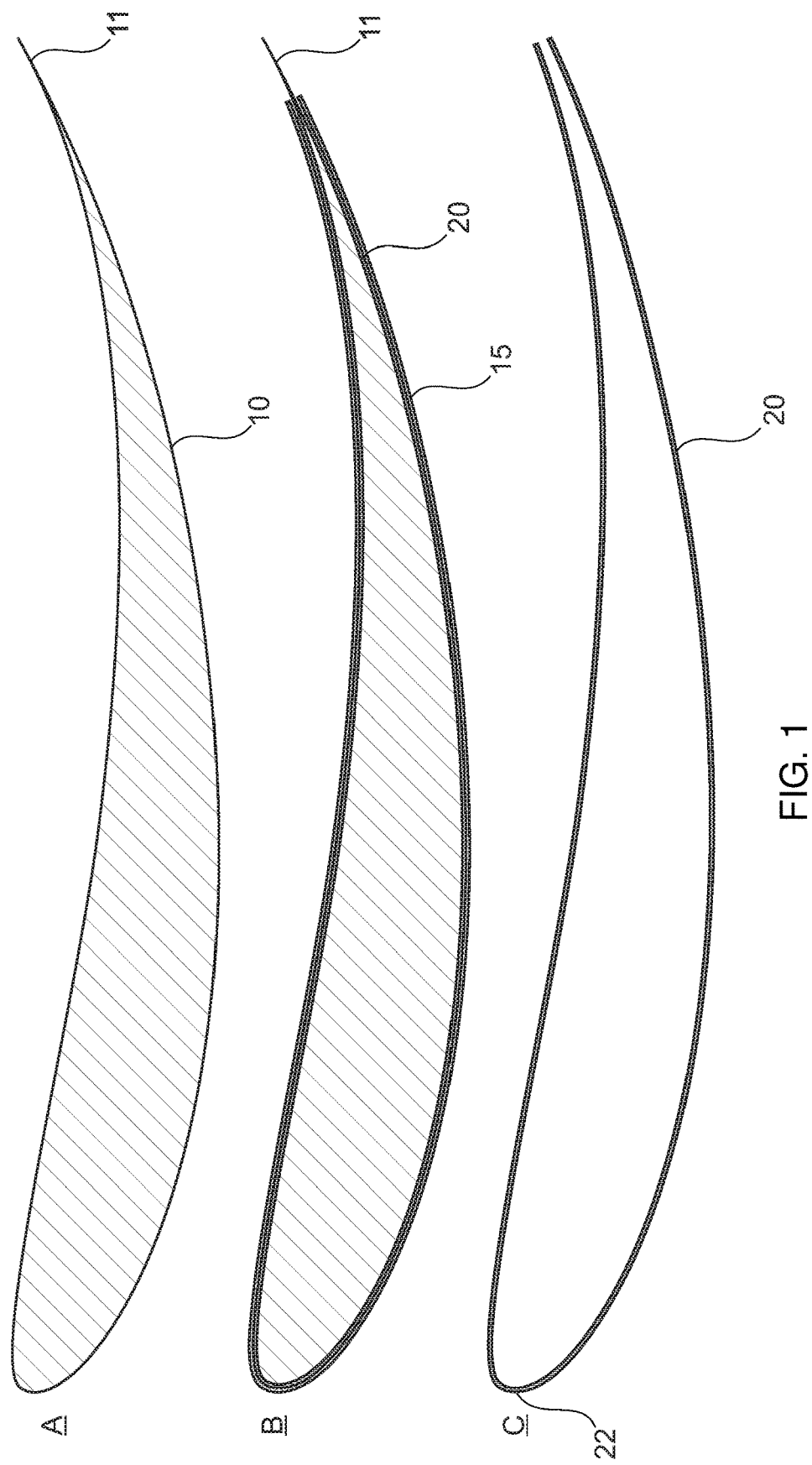
FIG. 1 shows a schematic view of the process according to the invention, where in (A) a coating (Teflon® (polytetrafluoroethylene) sheet) has been layered over a mold; in (B) carbon fiber composite material and a moldable sheet has been layered over the mold and Teflon® (polytetrafluoroethylene) film; and in (C) the finished carbon fiber composite aerofoil is shown.

An "aerofoil", also termed "airfoil", in the present context, relates to a structure that is in the shape of a wing, blade (such as propeller, rotor and turbine blades) or sail. The nature of aerofoil bodies is that they produce an aerodynamic force when traveling through a fluid, such as water or air. Aerofoils typically have an upper surface and a lower surface that meet at a leading edge that faces forward when the aerofoil moves through a fluid and a trailing edge at the back end of the aerofoil as it moves through a fluid.

The mold can be made using any suitable material that is easily moldable and is stable to pressure and heat applied during the curing process. Convenient materials used for such molds include thermoplastic materials, such as polypropylene materials, epoxy materials, such as epoxy syntactic tooling blocks that can be machined to any suitable three-dimensional shape.

A "layer", in the present context, is a layer of material that is thin relative to its outer dimensions (outer periphery). A layer can be a premade material or structure that is applied to a surface (e.g., a sheet). A layer can also be a layer of material that is provided on a surface by e.g. painting or spraying and forms a continuous thin structure over the surface.

The first layer has an adhesive or sticky side that faces the mold. The first layer can be provided as a sheet that is laid over the mold. In other words, the first layer can be provided as a first layer sheet that has a sticky or adhesive side that faces the mold and a non-sticky or non-adhesive side that faces outwardly, i.e. towards the composite material. The sheet thus provided preferably fits smoothly over the mold, with no air pockets or bubbles or irregular features on the sheet, i.e. it preferably fits snugly over the mold. The sticky or adhesive of the sheet ensures that the sheet, when placed over the mold, remains in place during the subsequent processing steps.

The first layer can also be provided as a film that is applied (for example, by spraying or painting) over the mold. The film when so applied preferably adheres to the mold, i.e. the film has an adhesive side that faces and sticks to the mold. The outer surface provides contact with the composite material that is non-adhesive, so that the mold with the outer film attached can be removed following curing of the composite material.

The non-sticky or non-adhesive side of the first layer provides the contact with the carbon fiber material. However, since the mold and attached sheet or layer are to be removed following the subsequent curing, it is important that the outer surface of the sheet be non-sticky, and remain so during the subsequent curing; in other words, the outer surface of the first layer should be easily detachable and/or removable from the layers of composite material (e.g., carbon fiber sheets) that is provided over the first layer.

The first layer can, when provided as a sheet (e.g., a Teflon® (polytetrafluoroethylene) sheet), preferably extend beyond the trailing edge of the aerofoil mold. This is done to facilitate the removal and separation of subsequent components (i.e., the aerofoil structure itself) from the mold. Accordingly, in one embodiment the first layer is provided as a first sheet of material having an adhesive side and a non-adhesive side. Preferably, the first sheet when so provided extends at its trailing edge, beyond the trailing edge of the mold.

The composite material can in general be any suitable composite material that has sufficient resiliency, flexibility and strength to be useful for use in aerofoils, while at the same time be light-weight.

It can be preferable that the composite material be a carbon fiber composite material, in particular an uncured carbon fiber material. Such materials are known in the art. The carbon fiber composite material can be supplied as a carbon fiber material, for example as a carbon fiber sheet or fabric that can be impregnated with a resin material to form a carbon fiber composite material.

The carbon fiber material can also be a preimpregnated or "prepreg" material. Such material is made from carbon fibers that have been impregnated with thermosetting resin. This is typically achieved by combining hot, melted resin with the fiber strands by applying a combination of heat and pressure. Such preimpregnated material can be premade and kept frozen until use.

The composite material can suitably be applied so that it fits smoothly and snugly over the underlying first sheet layer on the mold. The composite material can preferably extend, at its trailing edge, beyond the trailing edge of the underlying mold. Preferably, however, the trailing edge of the composite material does not extend as far as the trailing edge of an underlying first layer, when the first layer is provided as a sheet that is attached, via its adhesive side, to the mold.

Curing is a process of thermosetting a resin system or prepreg material, usually by applying cycles of temperature and pressure over time. Such curing can be applied using low temperatures such as room temperature, although higher temperature can be advantageous for the final properties of the material.

Composite fabrication processes usually involve some form of molding, to shape the resin. A mold tool can be used to give the unformed resin/fiber combination its shape prior to and during cure.

The most basic fabrication method for thermoset composites is by hand layup, which typically consists of laying dry fabric layers, or "plies," or prepreg layers, by hand onto a tool or mold to form a laminate stack. Resin is applied to the dry plies after layup is complete (e.g., by means of resin infusion). Alternatively, a preimpregnated carbon fiber material ("prepreg") can be used.

When the first layer is provided as a film that is applied (for example, by spraying or painting) over the mold, the method can further include providing one or more spacer at the trailing edge of the composite material when provided over the mold. The spacer can extend from the trailing edge of the mold to at least the trailing edge of the composite material that is applied over the mold. The purpose of such spacers, when used, is to ensure that the trailing edges of the composite material are physically separate during the following curing, and therefore do not stick together (melt together) as a result of the curing.

The moldable sheet can be applied over the composite material so that the trailing edge of the moldable sheet extends beyond that of the composite material. Preferably, the trailing edge of the moldable sheet (second sheet, when the first layer is provided as a sheet) does not extend to that of an underlying first layer, when provided as a sheet that is applied to the mold and allowed to extend beyond the trailing edge of the mold (as opposed to a film that is painted or sprayed onto the mold). Several curing methods are available. The most basic is simply to allow cure to occur at room temperature. Curing can be accelerated, however, by applying heat, typically with an oven, and pressure, by means of a vacuum. For the latter, a vacuum bag, with breather assemblies, is placed over the layup and attached to the tool, then evacuated using a vacuum pump before cure. The vacuum bagging process consolidates the plies of material and significantly reduces voids due to the off-gassing that occurs as the matrix progresses through its chemical curing stages.

Thus, curing can be performed by wrapping the molding assembly, for example by using a plastic bag, and applying vacuum to the wrapped assembly to remove air from the assembly, and subsequently applying heat and/or pressure to the assembly.

Autoclaves are commonly used for the curing process. During curing, the temperature can be ramped up or increased in small increments, and maintained at cure level (curing temperature) for a specified period of time defined by the resin system, then ramped down (decreased in increments) to room temperature, to avoid distortion or warp caused by uneven expansion and contraction.

Following the curing cycle and after parts are demolded, some parts go through a secondary freestanding postcure, during which they are subjected for a specific period of time to a temperature higher than that of the initial cure to enhance chemical crosslink density.

Electron-beam (E-beam) curing has been explored as an efficient curing method for thin laminates. In E-beam curing, the composite layup is exposed to a stream of electrons that provide ionizing radiation, causing polymerization and crosslinking in radiation-sensitive resins. X-ray and microwave curing technologies work in a similar manner. A fourth alternative, ultraviolet (UV) curing, involves the use of UV radiation to activate a photoinitiator added to a thermoset resin, which, when activated, sets off a crosslinking reaction. UV curing requires light-permeable resin and reinforcements.

Another curing method is a so-called out-of-autoclave (OOA) curing for high-performance composite components. Such curing involves heat only in an oven, or even at room temperature, without applying pressure.

Prepreg material is usually cured at elevated temperature. The process typically starts by applying vacuum to the material, for example by placing the material in a vacuum bag. This process allows consolidation of plies in the material and also provides a path for air and volatile materials to escape. The material, now imbedded in a vacuum bag, is then transferred to an autoclave where heat and pressure is applied. Curing temperatures typically are in the range of about 120° C. to about 200° C., such as about 140° C. to about 200° C., about 160° C. to about 200° C., or about 170° C. to about 190° C.

The pressure applied can range from about 2 atm to about 10 atm, such as about 4 atm to about 10 atm, about 5 atm to about 9 atm, about 6 atm to about 8 atm, or about 7 atm.

It can be preferable to cure carbon fiber prepreg material at a temperature of about 180° C. and a pressure of about 7 atm.

The description of composite materials useful in aerofoils used in airplanes is described in the AMT Airframe Handbook Volume 2 (FAA-H8083-31), which is available through the FAA website (www.faa.gov/regulations_policies/handbooks_manuals/aircraft/amt_airframe_handbook/) and which contents are hereby incorporated in their entirety.

The moldable (second) sheet has the role of providing a uniformly smooth outer surface of the final cured composite aerofoil. It is especially critical that the leading edge of the aerofoil be smooth, and free of cracks, bubbles or other irregularities. This is achievable by ensuring that the moldable sheet fits very snugly over the composite material on the mold.

It can be preferable that the moldable sheet have thermal expansion properties that are similar to those of the composite material, to minimize the formation of cracks or other irregularities in the composite material due to thermal expansion during the curing process.

Further, the moldable sheet can preferably be from a material that withstands the heat and pressure applied during the curing process. The sheet should preferably not lose its physical properties during the process, i.e. not melt or otherwise fuse into or stick to the composite material, since the sheet serves the principal role of providing physical support material to the composite material during the curing process and is removed following the curing. A "moldable" sheet, in the present context, is a sheet that is capable of being shaped by applying external force without breaking or cracking. Additionally, the moldable sheet for use in the invention should be stable with respect to the external conditions applied during the molding process. Thus, the moldable sheet should be from a material that is resilient to conditions of composite material curing (e.g., heat and pressure) so as to provide support to the underlying composite material, yet is pliable (shapeable) enough so that it can be shaped (molded) onto the composite material on the mold with relative ease.

When provided as a metal or metal alloy sheet, the moldable sheet is preferably thin enough so that it can be molded onto the composite on the plastic mold. It can be advantageous to "pre-mold" the sheet, for example by fitting the sheet over a mold that has the same three-dimensional structure as the mold being used. Such a mold can be the same mold that will be used in the assembly, or it can be another mold having an identical or near-identical three dimensional shape. This premolding step is to facilitate the fitting of the sheet over the composite-coated mold, and minimize the amount of additional molding that is required following the laying of the sheet over the mold. Thus, the moldable sheet can be pre-molded or pre-formed so as to have a three dimensional shape that is comparable to those of the upper and lower surfaces of the mold.

If desireable, one or more further layer of moldable sheet or other suitable clamping and/or pressing means that serve to secure the moldable sheet to the composite material during the subsequent curing, can be provided.

Following the application of the moldable sheet, including application of any further sheets or clamping means, the sheet can be molded over the underlying composite material (precursor material, i.e. material that has not been cured), so as ensure a snug fit of the sheet and eliminate all free spaces between the composite material and the sheet.

The moldable sheet can be a metal sheet or metal alloy sheet with a thickness in the range of about 0.1 mm to about 2.0 mm, such as about 0.2 mm to about 1.5 mm, about 0.3 mm to about 1.2 mm, or about 0.5 mm to about 1.0 mm.

Consequently, the moldable sheet is preferably a thin sheet, such as a thin metal or metal alloy sheet. Common metals used in metal alloys include aluminium, brass, copper, steel, tin, nickel and titanium. Alloys can further include small amounts of additional metals such as silicon, bismuth, lead, manganese, magnesium, zirconium, lithium, iron and titanium. The thickness of the sheet will in general vary depending on its pliability; i.e. the sheet should be thin enough so that it is pliable and can be fit very snugly onto the mold, while at the same time providing a structural support to the composite material on the mold so that during subsequent curing, there will be no formation of irregularities on the outer surface of the composite. This means that the sheet should be able to withstand the conditions (heat, pressure) applied during curing and not lose its ability to provide structural support to the molding assembly during the curing.

Following molding, the sides of the aerofoil can be sealed to close the sides of the structure. During curing, the sides are typically sealed using a thermostable tape or the like, to prevent leakage of resin from the composite material during curing. Sealing the sides can include removing such thermostable tape and closing the sides using prefabricated strips of composite material that are glued to the aerofoil. Prior to closing or sealing the sides, the aerofoil can be trimmed along its sides if so required.

Gluing can be done using conventional reagents and techniques. The glue can be any suitable single part or multipart glue, reactive or nonreactive. For example, the glue can be a cyanoacrylate glue, an epoxy glue, a polyurethane glue, an acrylic polymer glue, or the like. The edges can subsequently be finished by sanding using fine paper, such as fine sand paper. The sand paper can be very fine sand paper, such as 400 sand paper or finer, such as 600 sand paper or finer or 800 sand paper or finer.

The molded aerofoil can be provided with internal support or strengthening, if desired. Thus, internal beams such as "I" beams, internal foam inserts, or foam filling can be provided in the structure, if so desired. Foam inserts can for example comprise, or consist of, thin structures (e.g., panels or "slices") that have the same two-dimensional shape as the aerofoil when viewed end-on along its longitudinal axis, i.e. from the side. Such panel inserts can be inserted at any required interval along the longitudinal axis of the molded aerofoil, so as to provide the aerofoil with additional structural support. The flexibility of the molded aerofoil, before its trailing edge and side surfaces are closed and sealed, allows for the insertion of internal strengthening means as needed.

Foam fillings can comprise any suitable foam material that provides adequate structural support to the assembly while still being low-weight.

Thus, inserts and fillings can conveniently be arranged inside the molded aerofoil, which is relatively flexible, before sealing the sides of the aerofoil. Such inserts can be made from any suitable material, which is preferably light-weight and resilient. The inserts can for example be made from light-weight foam materials, aluminium or aluminium alloys, or carbon fiber or other suitable composite materials.

Following insertion of such inserts, the sides and trailing edge of the molded aerofoil structure can be sealed, to provide a final aerofoil. Sealing of the side edges of the aerofoil can include closing the sides with prefabricated side surfaces, which are preferably produced from the same composite material (e.g., carbon fibers) as the main aerofoil structure. Such prefabricated side panels or side surfaces can be attached to the aerofoil using conventions gluing means, e.g. using standard glues and/or epoxy resins. If needed, the sides and/or trailing edges can be trimmed prior to the sealing. Following such sealing, any resulting rough edges can be polished, for example by using fine sand paper.

Side panels can have the same geometry as the aerofoil, when viewed end-on along its longitudinal axis. Side panels can also have a different size and geometry, for example when the aerofoil is used as part of a wing assembly of for example a race car or the like, where more than one aerofoil may be mounted on the same general structure, and connected to the same side panels.

Additional coating can be provided on the final aerofoil, if so desired. The application of coating finishes can be useful for smoothing out any irregularities in a molded assembly. The disadvantage of such application is that it adds weight to the final structure. When weight is a critical feature, such in the manufacture of race car parts, this is undesirable.

One important advantage of the present invention is that by manufacturing the entire aerofoil in a single piece that includes the upper and lower surfaces and the leading (front) edge of the aerofoil, the need for post-production coating to even or smoothen out irregularities due to glueing or molding is decreased or eliminated.

Nevertheless, if so desired, the aerofoil manufactured according to the invention can, if desired be supplied with coating materials. For this purpose, coating materials and methods for their application are well known in the art.

The above features along with additional details of the invention, are described further in the examples below, which are intended to further illustrate the invention but are not intended to limit its scope in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Turning to FIG. 1, there is shown a schematic view of the process in accordance with the invention. In (A), a side view of a mold 10 is shown, over which a Teflon® (polytetrafluoroethylene) film 11 has been placed. The mold can be made from any suitable material, such as thermostable plastic resin materials. The mold will typically be slightly offset from the desired dimensions of the final composite aerofoil, to correct for the width/thickness of the Teflon® (polytetrafluoroethylene) film and carbon fiber composite that is layered over the mold. The Teflon® (polytetrafluoroethylene) film has an adhesive side that faces the mold so that the Teflon® (polytetrafluoroethylene) film sits securely and uniformly on the mold, and does not slip or lead to formation of air bubbles during the subsequent processing.

The mold has a leading edge 22, which corresponds to the leading edge of the aerofoil that is to be molded. The mold further has a trailing edge at its opposite end.

The Teflon® (polytetrafluoroethylene) film coating extends beyond the trailing edge of the mold, to facilitate the removal of the finished carbon composite structure at the end of the process. The trailing edge of the final carbon fiber composite aerofoil can, at the end of the process, be trimmed and bonded together to provide the final aerofoil wing.

Next, the carbon fiber composite material 20 is layered over the Teflon® (polytetrafluoroethylene) coating, as shown in (B). Any number of the composite material can be layered over, as desired for the final carbon fiber construct. The carbon fiber composite can be a prepreg composite. The material is layered over the mold and Teflon® (polytetrafluoroethylene) so as to extend beyond the trailing edge of the mold, but not so far as to extend to the trailing edge of the Teflon® (polytetrafluoroethylene) (shown in 11 in FIG. 1). At the end of the process, the trailing edge can then be trimmed as desired.

A moldable sheet 15 is subsequently placed over the carbon fiber layers on the mold. This is a critical step to ensure that the final carbon composite has a smooth outer surface, with no cracks, bubbles or edges. In particular, it is important to ensure that the leading edge of the aerofoil is absolutely smooth. Therefore, it is preferable to preform the moldable sheet in approximately the correct shape to fit snugly over the mold. After placing the sheet over the carbon layers on the mold, pressure can therefore be applied to the moldable sheet to ensure that it fits very snugly over the underlying structure. This can be done manually, for example by working the sheet by hand to ensure that it sits snugly and uniformly on the mold. During this process, particular care is taken to ensure uniform and snug fit over the leading edge of the aerofoil. This step is important to ensure uniform and smooth outer surface of the final carbon fiber composite aerofoil, and requires that the sheet be moldable enough to eliminate any gaps between the carbon fiber composite and the sheet, and at the same time be completely smooth, i.e. with no irregular parts on its inner surface. Again, the most sensitive part of the assembly is the leading edge.

It can be preferable that the trailing edge of the moldable sheet 15 extend beyond that of the carbon fiber composite. This is to ensure that the entire final carbon fiber composite be uniformly smooth across its outer surface.

The carbon fiber assembly comprising the mold 10 and layers of Teflon® (polytetrafluoroethylene) 11, carbon fiber composite 20 and moldable sheet 15 can now be cured. This is typically done by placing the assembly in a plastic bag which is subsequently evacuated to remove any air from the assembly. This is followed by curing at high temperature and pressure, usually in an autoclave. The temperature and pressure applied can typically be about 180° C. and 7 atm (about 100 psi).

In place of the Teflon® (polytetrafluoroethylene) sheet provided over the mold, it can be convenient to apply a layer having a sticky/adhesive side and a non-sticky (non-adhesive) by spraying/painting over the mold. When so provided, the material will not extend beyond the trailing edge of the mold. To compensate, one or more spacers can be provided (not shown in FIG. 1 or FIG. 2), extending from the trailing edge of the mold, serving the role of preventing the carbon fiber layers from adhering to each other during the subsequent curing process. Following curing, such spacers can be removed together with the moldable sheet and the mold to leave an intact carbon fiber aerofoil.

To prevent resin material from "leaking" out from the sides of the carbon fiber assembly during curing, the sides of the assembly can be sealed with a suitable sealant, such as a heat-resistant tape. The tape is subsequently removed after curing.

Figure 2:
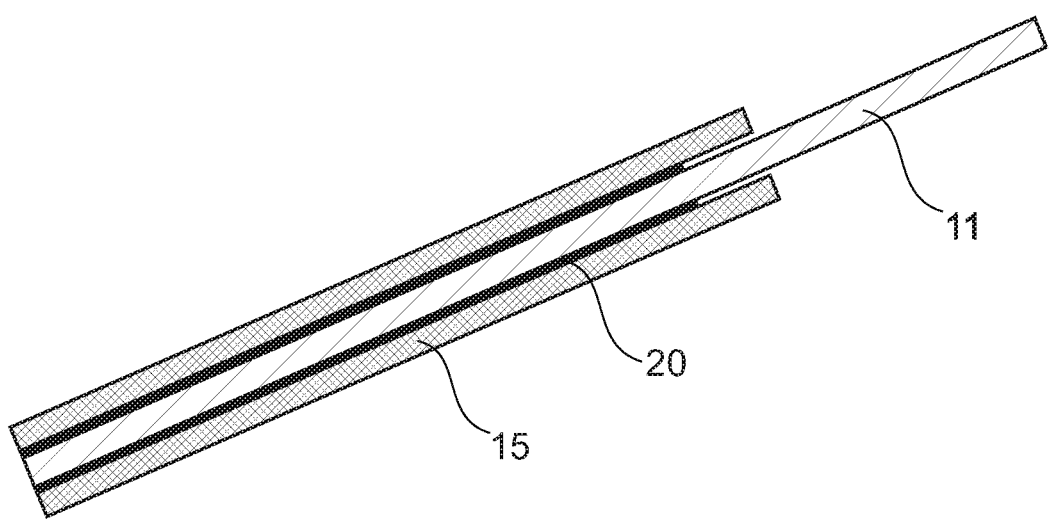
FIG. 2 shows a closeup view of the tail end of the image in FIG. 1 (B), showing schematically the layering of materials at the trailing edge of the aerofoil.

FIG. 2 shows a closeup view of the trailing edge of the mold/Teflon® (polytetrafluoroethylene)/carbon/sheet structure, illustrating the layering in the assembly. The view shown is schematic, illustrating the relative position of the respective layers at the trailing edge of the aerofoil structure. Thus, shown is the trailing end and edge of the Teflon® (polytetrafluoroethylene) coating 11, layers of carbon fiber 20 that are provided on the outer (non-sticky) side of the Teflon® (polytetrafluoroethylene), and the moldable sheet 15 that is molded over the carbon fiber composite. The trailing edge of the moldable sheet 15 is shown to extend beyond the trailing edge of the carbon fiber composite, but not as far the trailing edge of the Teflon® (polytetrafluoroethylene).

It will be apparent to the skilled person that the relative position of the various components in this example view is representative only. Thus, while it is important that the Teflon® (polytetrafluoroethylene) coat extend beyond the trailing edge of the mold, and that the trailing edges of the carbon fiber composite and the moldable sheet extend also beyond that of the mold but not so far as that of the Teflon® (polytetrafluoroethylene) sheet, the absolute lengths of these components is not critical. Further, the relative thickness of the respective layers is exemplary only, and will be modified depending on the actual materials being used for the molding assembly and the desired thickness and physical properties of the resulting aerofoil.

As will be apparent from the foregoing, some of the advantages of the present invention include:

molding of entire aerofoils in one piece that include both upper and lower surfaces of the aerofoil, eliminating need for post-molding assembly of individual parts;
eliminate or minimize irregularities in final structure, due to lack of gluing joints, thereby facilitate optimal aerodynamic properties of aerofoil;
minimize cost of production;
facilitate production of lightweight components, by minimizing use of post-production coating to improve air flow over structure.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

EXAMPLE

In the following, a non-limiting experimental example in accordance with the invention is described.

Using a standard grade epoxy syntactic tooling block (ACG TB720, provided by Advanced Composites Group), molds having the desired aerofoil shape were machined. The molds were corrected for the thickness of the Teflon® (polytetrafluoroethylene) sheet and Carbon Fiber composite precursor materials, so that the final aerofoils would have the desired dimensions. The molds had a shape, when viewed side-on (i.e. along its longitudinal axis) as shown in FIG. 1 herein. The length of the molds was 90-100 cm, and the thickness, at their thickest point, 5-10 cm.

A Teflon® (polytetrafluoroethylene) sheet having an adhesive back was laid over the molds, covering the entire upper and lower surfaces of the molds, and extending well beyond the trailing edge of the molds. The relative position of the Teflon® (polytetrafluoroethylene) sheet on the molds was as illustrated in FIG. 1.

Preimpregnated ("prepreg") carbon fiber sheets were next applied over the non-adhesive side of the Teflon® (polytetrafluoroethylene) sheet on the mold, taking care that no air bubbles were introduced under the carbon fiber sheets. A total of 3 layers of carbon fiber sheets were applied, each layer having a thickness of about 0.25 mm.

The next steps involved the application of a metal alloy sheet over the carbon layers. A thin metal alloy sheet was premolded to have the approximate shape of the aerofoil mold, to facilitate the application of the sheet to the mold. The sheet was then carefully applied over the carbon fiber layers and molded by hand so as to provide a very snug fit of the sheet to the carbon fibers on the mold. Particular care was taken to ensure a snug fit over the leading edge of the aerofoil so that there would be no bubble formation at the leading edge and/or leakage of resin from the carbon fiber prepreg material during the curing.

Curing was performed using standard conditions.

Following the curing, the outer metal alloy sheet and inner mold with the attached Teflon® (polytetrafluoroethylene) layer were removed, leaving an intact one-piece carbon fiber aerofoil.

Prior to closing the sides and trailing edges, internal strengthening panels were introduced. These were foam panels having the shape of the aerofoil when viewed from the side (see FIG. 1), so that the panels would fit snugly in the open space of the aerofoil. The reinforcement panels, each having a thickness of 1-1.5 cm, were provided at a density of one panel approximately every 8 cm along the aerofoils.

To complete the structure, the trailing edge and sides of the aerofoil were sealed. For this purpose, the trailing edges of the carbon fiber were trimmed and sealed using standard epoxy resin.

The sides of the aerofoil were sealed by securing preformed carbon fiber side panels to the molded aerofoil structure using epoxy resin. The side panels were further secured by the insertion of a hollow aluminium tube extending along the longitudinal axis of the aerofoil, through the entire aerofoil structure and through holes provided in the internal strengthening panels. The aluminium tube was provided with internal threadening so that it could be secured using bolts extending into the side panels, and the resulting hollow space on the outer side panels filled with epoxy resin to leave a smooth outer side surface on the aerofoil.

Following the incorporation of strengthening panels and sealing of the side panels, the subsequent edges were smoothed using fine sand paper.

The invention claimed is:

1. A method of producing a composite material aerofoil, the method comprising:
   a. providing a mold having a three-dimensional shape of an aerofoil to be molded, the mold having a front edge, a trailing edge and upper and lower surfaces that extend from the front edge to the trailing edge;
   b. providing a first layer having an adhesive side and a non-adhesive side over the mold, the first layer thereby having a front edge and a trailing edge, the first layer extending beyond the trailing edge of the aerofoil mold with the adhesive side facing the mold;
   c. laying composite precursor material over the non-adhesive side of the first layer, the composite material thereby having a front edge and a trailing edge;
   d. laying a moldable sheet over the composite precursor material on the mold, such that there is a snug fit of the moldable sheet to the composite precursor material, thereby generating a molding assembly;
   e. curing the molding assembly from step d;
   f. removing at least the moldable sheet and mold to provide a finished composite material aerofoil.

2. The method of claim 1, wherein the composite precursor material is uncured carbon fiber composite material.

3. The method of claim 1, wherein the first layer is provided as a first sheet having an adhesive side that faces the mold and a non-adhesive outer side, and wherein the sheet extends beyond the trailing edge of the aerofoil mold.

4. The method of claim 1, wherein the composite material is applied so as to extend beyond the trailing edge of the aerofoil mold, while not extending to the trailing edge of the first layer.

5. The method of claim 1, wherein the first layer covers the entire upper and lower surfaces of the mold.

6. The method of claim 1, wherein laying of composite precursor material comprises laying layers of carbon fiber composite material over the first layer.

7. The method of claim 1, wherein the moldable sheet is provided so as to extend beyond the trailing edge of the composite material but not extending to the trailing edge of the first layer.

8. The method of claim 1, wherein the first layer comprises a polytetrafluoroethylene sheet having an adhesive backing.

9. The method of claim 1, wherein the moldable sheet comprises a semi-rigid moldable material.

10. The method of claim 1, wherein the moldable sheet comprises a moldable metal or metal alloy sheet.

11. The method of claim 1, wherein following the laying of the moldable sheet over the composite precursor material, the sheet is molded onto the composite material on the mold, to ensure a snug fit of the moldable sheet on the mold and eliminate or minimize the amount of free space in the molding assembly.

12. The method of claim 1, wherein the laying a moldable sheet over the composite precursor material comprises manually molding the moldable sheet over the composite precursor material so as to eliminate free space between the composite material and the moldable sheet.

13. The method of claim 1, wherein the composite precursor material is provided as a preimpregnated carbon fiber material.

14. The method of claim 1, wherein the moldable sheet is pre-shaped to have approximately the same three-dimensional shape as the upper and lower surfaces of the mold.

15. The method of claim 1, wherein curing is performed by wrapping the molding assembly and apply vacuum to the wrapped assembly to remove air from the assembly, and subsequently applying heat and/or pressure to the assembly.

16. The method of claim 1, further comprising trimming and sealing at least a trailing edge of the composite material aerofoil.

17. The method of claim 1, further comprising sealing sides and trailing edge of the composite material aerofoil.

* * * * *